(12) United States Patent
Iwasaki (10) Patent No.: US 10,897,163 B2
(45) Date of Patent: Jan. 19, 2021

(54) WIRELESS POWER TRANSMITTER

(71) Applicant: ROHM CO., LTD., Kyoto (JP)

(72) Inventor: Tatsuya Iwasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 155 days.

(21) Appl. No.: 16/110,351

(22) Filed: Aug. 23, 2018

(65) Prior Publication Data

US 2019/0006889 A1 Jan. 3, 2019

Related U.S. Application Data

(63) Continuation of application No. PCT/JP2017/001997, filed on Jan. 20, 2017.

(30) Foreign Application Priority Data

Feb. 24, 2016 (JP) .................. 2016-033268

(51) Int. Cl.
*H02J 50/60* (2016.01)
*H02J 50/10* (2016.01)
*H02J 50/80* (2016.01)
*H02J 50/90* (2016.01)
*H02J 50/05* (2016.01)
*H02J 7/02* (2016.01)
*H02J 7/04* (2006.01)

(52) U.S. Cl.
CPC .............. *H02J 50/60* (2016.02); *H02J 7/025* (2013.01); *H02J 7/042* (2013.01); *H02J 50/05* (2016.02); *H02J 50/10* (2016.02); *H02J 50/80* (2016.02); *H02J 50/90* (2016.02)

(58) Field of Classification Search
CPC .. H02J 50/05; H02J 50/10; H02J 50/60; H02J 50/80; H02J 50/90; H02J 7/025; H02J 7/042
USPC .......................................................... 307/104
See application file for complete search history.

(56) References Cited

FOREIGN PATENT DOCUMENTS

| JP | 2001102974 A | 4/2001 |
|----|--------------|--------|
| JP | 0005071574 B1 | 8/2012 |
| JP | 2012191268 A | 10/2012 |
| JP | 2013017336 A | 1/2013 |
| JP | 2013038854 A | 2/2013 |
| JP | 2015537495 A | 12/2015 |

OTHER PUBLICATIONS

JPO Notice of Reasons for Refusal corresponding to Application No. 2018-501057; dated Jul. 23, 2019.
International Search Report corresponding to Application No. PCT/JP2017/001997; dated Feb. 28, 2017.
Written Opinion of the International Searching Authority corresponding to Application No. PCT/JP2017/001997; dated Feb. 28, 2017.

*Primary Examiner* — Hal Kaplan
(74) *Attorney, Agent, or Firm* — Cantor Colburn LLP (57) ABSTRACT

A power transmitter transmits an electric power signal S2 to a wireless power receiver. A transmission antenna includes a transmission coil and a resonance capacitor coupled in series. A driver applies a driving signal S1 to the transmission coil. A TX controller controls the driver. A wireless device detector of the TX controller detects a neighboring wireless device before electric power transmission is started.

21 Claims, 5 Drawing Sheets

FIG. 1

PRIOR ART

FIG. 2

PRIOR ART

WIRELESS POWER TRANSMITTER

CROSS REFERENCE TO RELATED APPLICATION(S)

This application is a bypass continuation under 35 U.S.C. § 120 of PCT/JP2017/001997, filed Jan. 20, 2017, which is incorporated herein reference and which claimed priority to Japanese Application No. 2016-033268, filed Feb. 24, 2016. The present application likewise claims priority under 35 U.S.C. § 119 to Japanese Application No. 2016-033268, filed Feb. 24, 2016, the entire content of which is also incorporated herein by reference.

BACKGROUND OF THE INVENTION

1. Field of the Invention

The present invention relates to a wireless power transmission, and particularly to an abnormal state detection function of a wireless power transmitter.

2. Description of the Related Art

In recent years, as a power supply method for supplying electric power to an electronic device, a wireless power supply method has been becoming popular. Such a wireless power supply method can be classified into two methods, i.e., the magnetic induction (MI) method and the magnetic resonance (MR) method. At present, as the MI method, (1) the "Qi" standard developed by the WPC (Wireless Power Consortium) and (2) the standard developed by the PMA (Power Matters Alliance) (which will be referred as the "PMA standard" hereafter) have become mainstream.

The wireless power supply employing the MI method uses electromagnetic induction between a transmission coil and a reception coil. The power supply system is configured including a power transmitter including a transmission coil and a power receiver including a reception coil.

The wireless power supply system employing the MI method is designed assuming that power is supplied in a one-to-one manner in a state in which a power transmitter and a power receiver are in contact with each other. Furthermore, another standard (the MR method) for such a wireless power transmitter has been developed, which allows a charging operation in a wider range than that provided by the MI method. A mixed environment can be assumed in which wireless power transmitters employing the MI method and wireless power transmitters employing the MR method are both in actual use in the same space. In such a situation, the present inventor has come to recognize the following problem.

FIRST PROBLEM

Figure 1:
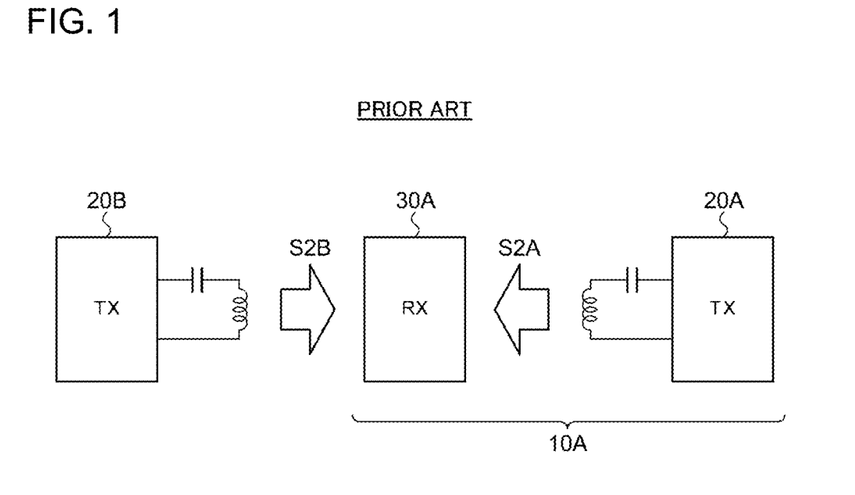
FIG. 1 is a diagram for explaining a first problem.

FIG. 1 is a diagram for explaining a first problem. Description will be made assuming that power is supplied in a power supply system 10A including a power transmitter (first power transmitter) 20A and a power receiver 30A. Furthermore, description will be made assuming that there is another power transmitter 20B that supports a wide charging range in the neighboring area, and that the power transmitter 20B starts a power supply operation. In this case, the power receiver 30A receives an excessive supply of power S2A and S2B from both the two power transmitters 20A and 20B. In some cases, this leads to a problem of the power receiver 30A generating heat. Also, this has the potential to cause adverse effects on the reliability of internal circuit elements of the power receiver 30A.

SECOND PROBLEM

Figure 2:
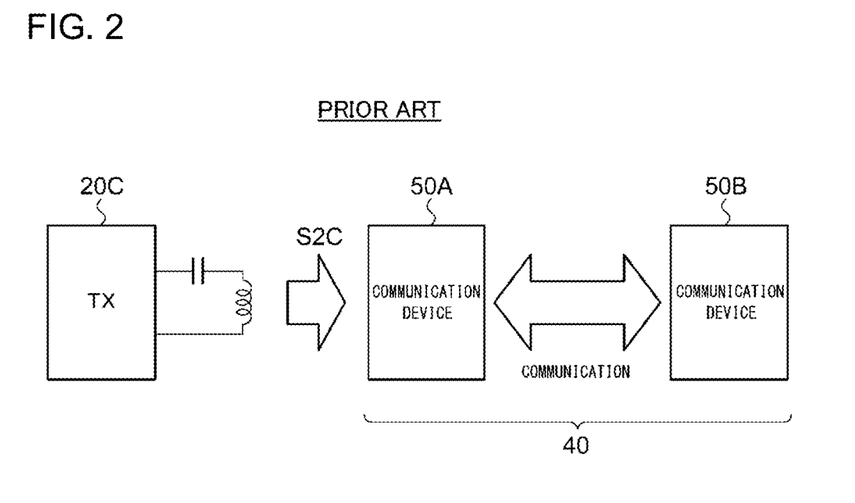
FIG. 2 is a diagram for explaining a second problem.

FIG. 2 is a diagram for explaining a second problem. Description will be made assuming that two communication apparatuses 50A and 50B that form a communication system 40 communicate with each other in the vicinity of a power transmitter 20C. In a case in which the power transmitter 20C generates an electric power signal S2C with a frequency that is close to the wireless frequency employed by the communication apparatuses 50A and 50B, this arrangement has the potential to cause interference between them. In some cases, this leads to abnormal operations of the communication apparatuses 50A and 50B.

SUMMARY OF THE INVENTION

The present invention has been made in order to solve such a problem. Accordingly, it is an exemplary purpose of an embodiment of the present invention to provide a wireless power transmitter that is capable of solving at least one of the above-described problems.

An embodiment of the present invention relates to a wireless power transmitter. The wireless power transmitter includes: a transmission antenna including a resonance capacitor and a transmission coil coupled in series; a driver including a bridge circuit structured to apply a driving voltage to the transmission antenna; and a power transmission control circuit structured to control the driver. The power transmission control circuit includes a wireless device detector structured to detect a neighboring wireless device before electric power transmission is started.

Examples of the "wireless device" include wireless power transmitters and devices configured to support wireless communication. With this embodiment, such an arrangement is capable of detecting a neighboring wireless device employing the same frequency as that of the transmission frequency of the wireless power transmitter, or a frequency band in the vicinity of the transmission frequency, before the supply of power is started. This arrangement is capable of preventing an excessive supply of power to a power receiver that is receiving a supply of power from another wireless power transmitter, and of preventing electromagnetic wave interference with wireless communication of a communication device.

Also, the wireless device detector may detect the wireless device based on an electrical state of the transmission antenna in a state in which the driver suspends a switching operation thereof.

In a state in which the driver suspends its switching operation, this arrangement allows the transmission antenna to function as a reception antenna that is capable of detecting electromagnetic waves in a frequency band including the power transmission frequency. It should be noted that, in the present specification, the electromagnetic waves as described above include an electric power signal generated by the wireless power transmitter.

Also, the wireless device detector may detect the wireless device based on an electrical state of a power supply line of the driver in a state in which a supply of power to the driver is suspended.

In a state in which the driver suspends its switching operation, the driver functions as a diode rectifier circuit. When the transmission antenna receives an electromagnetic wave from a neighboring wireless device, the current that flows through the transmission antenna is rectified by the diode rectifier circuit. This appears as a change in the state of the power supply line, thereby allowing a neighboring wireless device to be detected.

With an embodiment, the wireless power transmitter may further include a reception coil. Also, the wireless device detector may detect the wireless device based on an electrical state of the reception coil before electric power transmission is started. In this case, the reception coil can be designed such that it is suitable for detecting a neighboring wireless device, thereby allowing the detection sensitivity to be improved.

Also, the wireless device detector may detect the wireless device based on an electrical state of the reception coil after electric power transmission is started. In a case in which such a reception coil is provided, this arrangement is capable of detecting a neighboring wireless device even after the supply of power is started by means of the transmission coil.

Also, the power transmission control circuit may be configured such that, when the wireless device is detected, electric power is not transmitted. This provides improved safety.

Also, the power transmission control circuit may include a notification unit structured to notify an external circuit of a detection of the wireless device.

Also, the wireless power transmitter may conform to at least one from among the Qi standard and the PMA standard.

Another embodiment of the present invention relates to a charger. The charger includes any one of the wireless power transmitters described above.

Yet another embodiment of the present invention relates to a power transmission control circuit structured to control a wireless power transmitter. The wireless power transmitter includes: a transmission antenna including a resonance capacitor and a transmission coil coupled in series; and a driver including a bridge circuit structured to apply a driving voltage to the transmission antenna. The power transmission control circuit includes: a demodulator structured to demodulate a control signal received by the transmission antenna; an electric power controller and a pre-driver structured to control the driver according to the control signal; and a wireless device detector structured to detect a neighboring wireless device before electric power transmission is started.

The power transmission control circuit may monolithically be integrated on a single semiconductor substrate.

Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Embodiment

Figure 3:
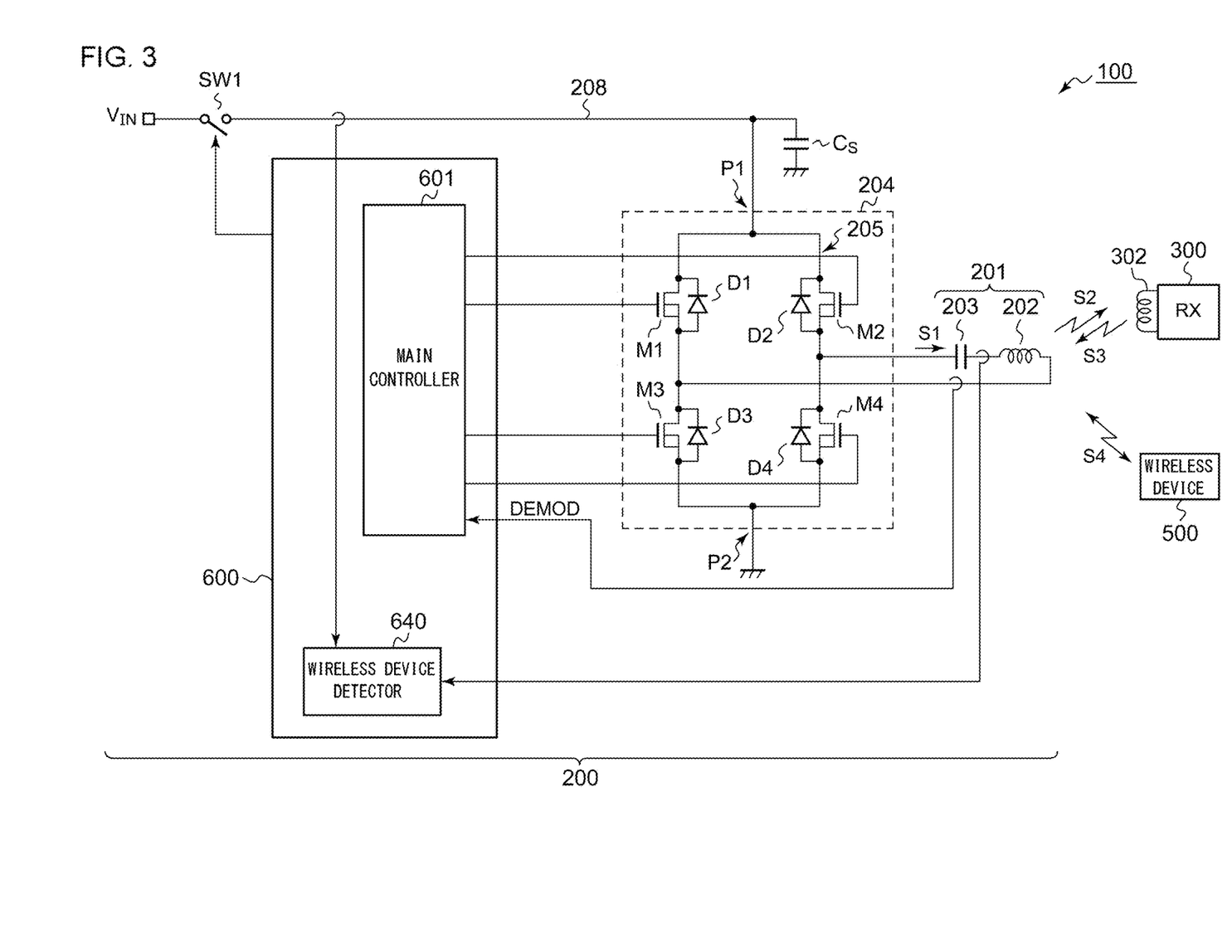
FIG. 3 is a block diagram showing a power supply system including a wireless power transmitter according to a first embodiment.

FIG. 3 is a block diagram showing a power supply system 100 including a wireless power transmitter 200 according to a first embodiment. The power supply system 100 includes a power transmitter 200 and a power receiver 300. The power receiver 300 is mounted on an electronic device such as a cellular phone terminal, smartphone, audio player, game machine, tablet terminal, or the like. The power transmitter 200 conforms to at least one from among the Qi standard and the PMA standard. Description will be made in the present embodiment regarding a configuration and an operation that conform to the Qi standard.

The power transmitter 200 is mounted on a charger including a charging stand. The power transmitter 200 includes a transmission antenna 201, a driver 204, a high-side switch SW1, and a power transmission control circuit (which will be referred to as a "TX controller" hereafter) 600.

The transmission antenna 201 includes a transmission coil 202 and a resonance capacitor 203 coupled in series. The driver 204 is configured as an inverter circuit including an H-bridge circuit (full-bridge circuit) or otherwise a half-bridge circuit. The driver 204 provides a switching operation so as to apply a driving signal S1, and specifically, in the form of a pulse signal, to the transmission coil 202. This provides a driving current that flows through the transmission coil 202, which generates an electric power signal S2 via the transmission coil 202 in the form of an electromagnetic field signal. Description will be made in the present embodiment regarding an arrangement employing a full-bridge circuit. In a normal supply of power, a DC voltage $V_{IN}$ is supplied to an upper-side power supply terminal P1 of a bridge circuit 205, and a lower-side power supply terminal P2 is grounded. Also, a smoothing capacitor $C_S$ may be coupled to the upper-side power supply terminal P1.

The high-side switch SW1 is arranged on a power supply line that extends to the upper-side power supply terminal P1 of the bridge circuit 205. By switching on and off the high-side switch SW1, this arrangement controls the supply of power to the bridge circuit 205.

The TX controller 600 is configured as a circuit block that integrally controls the overall operation of the power transmitter 200. The TX controller 600 may be configured as an IC monolithically integrated on a single semiconductor substrate. Also, the TX controller 600 may be configured as a combination of multiple ICs or chip components.

The TX controller 600 includes a main controller 601 and a wireless device detector 640. The main controller 601 supports operations relating to the supply of power to the power receiver 300.

In the Qi standard, a protocol is defined for communication between the power transmitter 200 and the power receiver 300, which enables a control signal S3 to be transmitted from the power receiver 300 to the power transmitter 200. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") for controlling an amount of electric power to be supplied to the power receiver 300, and data which indicates the particular information for identifying the power receiver 300. Also, the control signal S3 may include a threshold value that defines a suitable range of the Q value of the transmission antenna 201.

The main controller 601 receives, via a demodulation terminal (DEMOD), a signal that corresponds to a coil current or a coil voltage, and demodulates the control signal S3 included in the current or otherwise the voltage at the transmission coil 202. The main controller 601 controls the driver 204 based on electric power control data included in the control signal S3 thus demodulated.

Specifically, the main controller 601 controls the switching frequency fsw of the bridge circuit 205, the duty ratio of the switching operation, the operation mode (half-bridge mode/full-bridge mode), or the phase difference between the legs of the bridge circuit 205 in the full-bridge mode, based on the electric power control data, so as to change the electric power to be transmitted.

Before the start of the power transmission from the power transmitter 200 to the power receiver 300, the wireless device detector 640 detects a neighboring wireless device 500. The wireless device detector 640 detects, as a detection target, a wireless device 500 that transmits and/or receives an electromagnetic wave S4 included in a frequency band of the electric power signal S2 that can be generated by the power transmitter 200, i.e., a wireless device 500 having the potential to cause electromagnetic wave interference with the electric power signal S2. Examples of the wireless device 500 include another neighboring wireless power transmitter (charger), a wireless communication device, a wireless remote controller, etc. The phrase "before the start of the power transmission" may correspond to "before transition to a power transfer phase" in the Qi standard.

The wireless device detector 640 judges the presence or absence of the wireless device 500 based on a change in the electrical state of the power transmitter 200 that occurs due to an electromagnetic wave generated by the wireless device 500 which is an external device. Description will be made below regarding several examples of a detection method and a detection operation for detecting the wireless device 500.

First Detection Method

In a case in which the frequency of the electromagnetic wave S5 to be transmitted or received to or from the wireless device 500 is included in the frequency band of the transmission antenna 201, a current is induced in the transmission antenna 201 due to the electromagnetic wave S5. This leads to: (i) a change in the coil current that flows through the transmission coil 202, (ii) a change in the coil voltage across the transmission coil 202, (iii) a change in the capacitor voltage across the resonance capacitor 203; or (iv) a change in the antenna voltage across the transmission antenna 201. Accordingly, the wireless device detector 640 detects the wireless device 500 based on the electrical state of the transmission antenna 201.

For example, the wireless device detector 640 monitors at least one from among (i) the voltage at a connection node that couples the transmission coil 202 and the resonance capacitor 203 and (ii) the coil current that flows through the transmission coil 202, so as to judge the presence or absence of the wireless device 500.

The coil current detection method is not restricted in particular. For example, an ISENSE signal may be used. Alternatively, in order to detect the coil current with high precision, a current sensor may also be provided. For example, such a current sensor may detect a current that flows through a transistor that forms the bridge circuit 205. A method for detecting the current that flows through the transistor may be designed using known techniques. Also, in a case in which a power supply circuit configured to generate a power supply voltage for the bridge circuit 205 includes a current sensor, the current detection value detected by the current sensor may be used as the coil current value.

It should be noted that, in a case in which the coil current is monitored in a detection period, this arrangement requires a path through which the coil current flows. In this period, a pair of transistors M1 and M4 (or otherwise a pair of transistors M2 and M3) may be turned on, and the remaining transistors may be turned off. Alternatively, all the transistors M1 through M4 may be turned off, and the bridge circuit 205 may be operated as a diode rectifier circuit. In this state, the coil current may be monitored based on the ISENSE signal.

In a case in which the coil voltage is monitored, all the transistors M1 through M4 may be turned off so as to set both ends of the transmission antenna 201 to a high-impedance state. The high-side switch SW1 may be turned on or otherwise turned off.

Second Detection Method

In a second detection method, the high-side switch SW1 is turned off, and accordingly, the supply of power to the driver 204 is suspended. The power supply line 208 coupled to the driver 204 is set to a high-impedance state.

In a state in which the switching operation is suspended, the driver 204 functions as a diode rectifier circuit. Accordingly, when the transmission antenna 201 receives the electromagnetic wave S4 from the neighboring wireless device 500, the current that flows through the transmission antenna 201 is subjected to full-wave rectification (or otherwise half-wave rectification) by means of the diode rectifier circuit. This leads to a change in the electrical state of the power supply line 208. Accordingly, the wireless device detector 640 detects the wireless device 500 based on the electrical state of the power supply line 208.

For example, the wireless device detector 640 may monitor at least one from among: (iii) the voltage at the power supply line 208; and (iv) the current that flows through the power supply line 208, so as to judge the presence or absence of the wireless device 500.

When the wireless device 500 is detected by the wireless device detector 640, the TX controller 600 does not transmit electric power to the power receiver 300. Also, upon detecting the wireless device 500, the TX controller 600 may notify another circuit of this information. For example, a charger mounting the power transmitter 200 may be provided with an alarm configured as an LED, a speaker that generates a beep, or the like, in order to notify the charger user of the presence of the wireless device 500 according to the notice.

The above is the configuration and the operation of the power transmitter 200.

With the power transmitter 200, when a situation has occurred in which there is such a wireless device 500 in the neighboring area, this arrangement is capable of suspending power transmission to the power receiver 300. For example, in a case in which such a wireless device 500 is another power transmitter that differs from the power transmitter 200, this arrangement is capable of preventing the power receiver 300 from generating heat due to the supply of power from the two power transmitters.

For example, in a case in which the wireless device 500 is a wireless communication device, this arrangement is capable of suppressing interference with communication of the wireless communication device. This prevents the occurrence of an abnormal operation of the wireless communication device.

In a case in which the wireless device 500 is configured as a remote controller, this arrangement is capable of preventing the occurrence of an abnormal operation in a device to be controlled by the remote controller. For example, remote controllers for a vehicle employing a keyless entry or smart entry system employ a frequency that is close to those employed in the Qi standard or the PMA standard. Accordingly, in a case in which a charger including the power transmitter 200 is mounted on a vehicle, this arrangement has a problem of interference between them. With the power transmitter 200 according to the embodiment, this arrangement is capable of preventing the occurrence of an abnormal operation of the remote controller.

The present invention encompasses various kinds of apparatuses and circuits that can be regarded as a block configuration or a circuit configuration shown in FIG. 3, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 4:
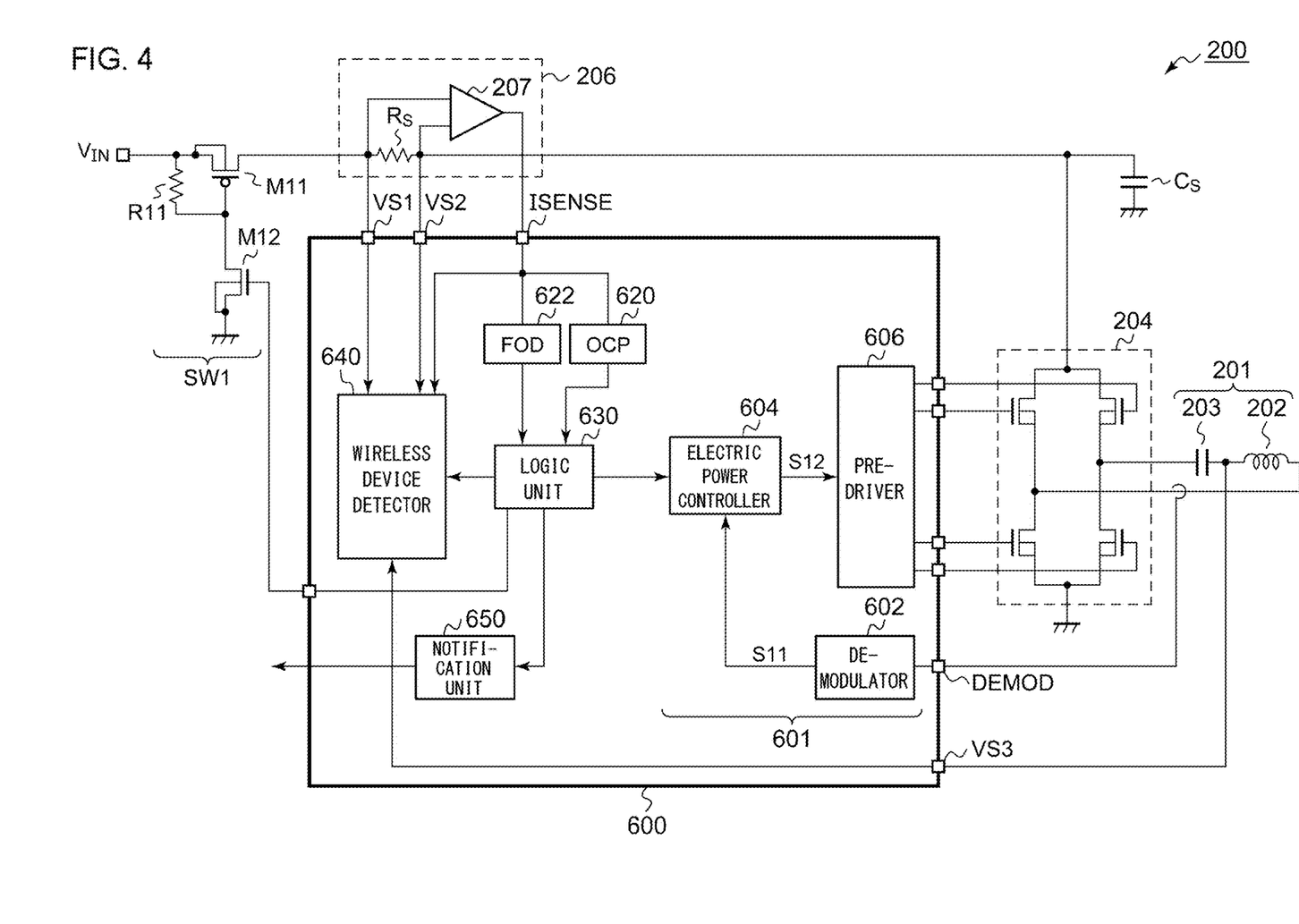
FIG. 4 is a block diagram showing a specific example configuration of the power transmitter shown in FIG. 3.

FIG. 4 is a block diagram showing a specific example configuration of the power transmitter 200 shown in FIG. 3.

The main controller 601 includes a demodulator 602, an electric power controller 604, and a pre-driver 606. The demodulator 602 demodulates the control signal S3 included in the current or otherwise voltage that is applied to the transmission coil 202. The electric power controller 604 generates a control instruction S12 that indicates the switching frequency, the duty ratio, or the operation mode (half-bridge mode/full-bridge mode) of the driver 204, or the phase difference between the legs in the full-bridge mode. The pre-driver 606 drives the bridge circuit 205 according to the control instruction S12.

A current sensor 206 is provided in order to support foreign object detection or overcurrent protection. The current sensor 206 detects a current IN that flows through the driver 204, and generates a current detection (ISENSE) signal that indicates an amount of current. The current sensor 206 may include a sensing resistor $R_S$ and a sensing amplifier 207. The ISENSE signal is input to an ISENSE terminal of the TX controller 600. The TX controller 600 supports foreign object detection or overcurrent protection based on the ISENSE signal.

Relating to foreign object detection and overcurrent protection, an OCP (overcurrent protection) circuit 620 and a FOD (foreign object detection) circuit 622 are provided. The OCP circuit 620 compares the ISENSE signal with a predetermined threshold value so as to detect the occurrence of an overcurrent state. Upon detecting the overcurrent state, the high-side switch SW1 is switched to the off state, and the operation of the driver 204 is suspended.

The FOD circuit 622 calculates the transmitted electric power based on the ISENSE signal. Furthermore, the FOD circuit 622 compares the transmitted electric power thus calculated with the information with respect to received electric power included in the control signal S3 so as to judge the presence or absence of a foreign object using a power loss method.

A logic unit 630 integrally controls the overall operation of the TX controller 600. Furthermore, the logic unit 630 provides a sequence control operation for the wireless power supply and the abnormal operation detection.

The wireless device detector 640 may judge the presence or absence of the wireless device 500 based on at least one from among the voltage at the VS1 terminal, the voltage at the VS2 terminal, the voltage at the VS3 terminal, or the voltage of the ISENSE signal. The specific judgment method is designed as described above.

Upon detecting the wireless device 500, the logic unit 630 turns off the high-side switch SW1. In the case shown in FIG. 4, the high-side switch SW1 includes transistors M11 and M12 and a resistor R11. By turning off the transistor M12, the logic unit 630 is capable of turning off the transistor M11, thereby suspending the supply of power to the driver 204. Upon detecting the wireless device 500, the wireless device detector 640 instructs the electric power controller 604 to suspend the power supply operation. In this state, the electric power controller 604 suspends the control operation of the driver 204.

Upon detecting the wireless device 500, a notification unit 650 notifies an external processor or the like of this information. The notification unit 650 may be configured as an I²C interface or SPI (Serial Peripheral Interface). Alternatively, the notification unit 650 may generate a flag signal in the form of a binary signal that can be set to the high level or low level, and may output the flag signal to an external circuit.

Second Embodiment

Description has been made in the first embodiment regarding an arrangement using the transmission antenna 201 as a sensor for detecting the wireless device 500. In contrast, a power transmitter according to a second embodiment is provided with a dedicated antenna for detecting the wireless device 500.

Figure 5:
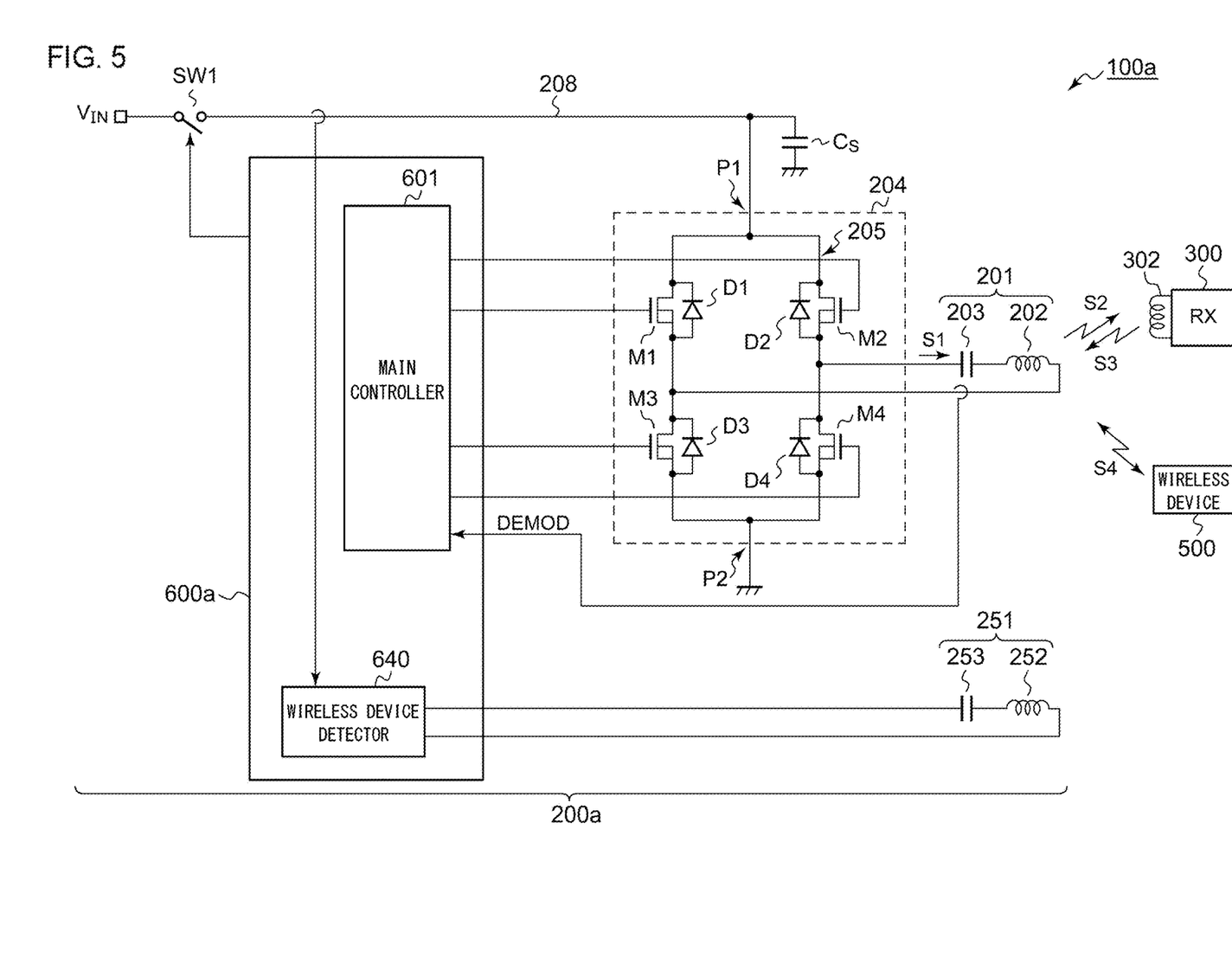
FIG. 5 is a block diagram showing a power supply system including a power transmitter according to a second embodiment.

FIG. 5 is a block diagram showing a power supply system 100a including a power transmitter 200a according to the second embodiment. The power transmitter 200a includes a reception antenna 251. The reception antenna 251 includes a reception coil 252 and a resonance capacitor 253 coupled with the reception coil 252 in series (or otherwise in parallel). The resonance frequency and the Q value of the reception antenna 251 may be designed such that they cover the frequency of the electromagnetic wave S4 to be generated by the wireless device 500. The reception antenna 251 may be configured as a replica of the transmission antenna 201.

The wireless device detector 640 detects the wireless device 500 based on the electrical state of the reception coil 252.

More specifically, the wireless device detector 640 is capable of detecting the wireless device 500 based on a change in voltage or current applied to the reception antenna 251 that occurs due to the electromagnetic wave S4 in a state in which the operation of the driver 204 is suspended before electric power transmission is started.

Instead of or otherwise in addition to such an operation, the wireless device detector 640 is capable of detecting the wireless device 500 based on a change in voltage or current applied to the reception antenna 251 that occurs due to the electromagnetic wave S4 after the electric power transmission is started.

With the first embodiment, the resonance frequency and the Q value of the transmission coil 201 are required to be designed giving consideration to the power transmission efficiency or the like. In contrast, the reception antenna 251 according to the second embodiment can be designed to be most suitable for detection of the neighboring wireless device 500 without consideration of the power transmission efficiency or the like. Thus, this arrangement provides improved detection sensitivity.

Furthermore, this arrangement is capable of detecting the neighboring wireless device 500 after electric power transmission is started in addition to before electric power transmission is started. For example, description will be made regarding a case in which there is another power transmitter in a power-off state adjacent to the power transmitter 200a. In this case, a situation can occur in which the power supply for the adjacent power transmitter is turned on after the power transmitter 200a starts power transmission. Also, another situation can occur in which a wireless communication device approaches the power transmitter 200a after the power transmitter 200a starts power transmission. The second embodiment allows such a wireless device to be detected even if such a situation has occurred, thereby providing improved safety.

It should be noted that, even in a case in which the reception antenna 251 is provided, the wireless device 500 may be detected based on the electrical state of the transmission antenna 201 or the power supply line 208 before electric power transmission is started, in the same way as the first embodiment. This arrangement provides further improved detection precision.

A TX controller 600a shown in FIG. 5 may be configured in the same manner as the TX controller 600 shown in FIG. 4. In this case, the signal to be monitored by the wireless device detector 640 may preferably be modified.

Figure 6:
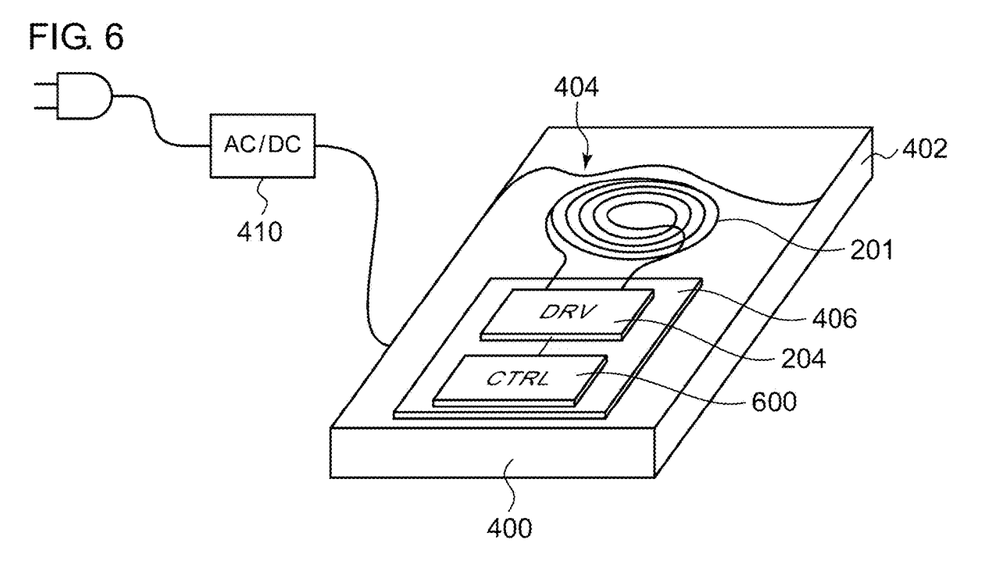
FIG. 6 is a circuit diagram showing a charger including a power transmitter.

Next, description will be made regarding the usage of the power transmitter 200. FIG. 6 is a circuit diagram showing a charger 400 including the power transmitter 200. The charger 400 charges an electronic device including the power receiver 300. The charger 400 includes a housing 402, a charging stand 404, and a circuit substrate 406. The charger 400 may be configured as an in-vehicle charger. The electronic device to which electric power is to be supplied is mounted on the charging stand 404. The driver 204, the TX controller 600, and other circuit components are mounted on the circuit substrate 406. The transmission antenna 201 is laid out directly below the charging stand 404. The charger 400 may receive a DC voltage via an AC/DC converter 410. Also, the charger 400 may include such an AC/DC converter as a built-in component. Alternatively, the charger 400 may receive a supply of DC electric power from an external circuit via a bus including a power supply line such as a USB (Universal Serial Bus). In a case in which the charger 400 is provided with the power transmitter 200a according to the second embodiment, the reception antenna 251 is provided as an additional component.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmitter comprising:
   a transmission antenna comprising a resonance capacitor and a transmission coil coupled in series;
   a driver comprising a bridge circuit structured to apply a driving voltage across the transmission antenna; and
   a power transmission control circuit structured to control the driver,
   wherein the power transmission control circuit comprises a wireless device detector structured to detect a neighboring wireless device before electric power transmission is started.

2. The wireless power transmitter according to claim 1, wherein the wireless device detector detects the wireless device based on an electrical state of the transmission antenna in a state in which the driver suspends a switching operation thereof.

3. The wireless power transmitter according to claim 1, wherein the wireless device detector detects the wireless device based on an electrical state of a power supply line of the driver in a state in which a supply of power to the driver is suspended.

4. The wireless power transmitter according to claim 1, further comprising a reception coil,
   wherein the wireless device detector detects the wireless device based on an electrical state of the reception coil before electric power transmission is started.

5. The wireless power transmitter according to claim 1, wherein the wireless device detector detects the wireless device based on an electrical state of the reception coil after electric power transmission is started.

6. The wireless power transmitter according to claim 1, wherein, when the wireless device is detected, the power transmission control circuit does not transmit electric power.

7. The wireless power transmitter according to claim 1, wherein the power transmission control circuit comprises a notification unit structured to notify an external circuit of a detection of the wireless device.

8. The wireless power transmitter according to claim 1, that conforms to at least one from among the Qi standard and the PMA standard.

9. A charger comprising the wireless power transmitter according to claim 1.

10. A power transmission control circuit structured to control a wireless power transmitter, wherein the wireless power transmitter comprises:
   a transmission antenna comprising a resonance capacitor and a transmission coil coupled in series; and
   a driver comprising a bridge circuit structured to apply a driving voltage across the transmission antenna,
   and wherein the power transmission control circuit comprises:
      a demodulator structured to demodulate a control signal received by the transmission antenna;
      an electric power controller and a pre-driver structured to control the driver according to the control signal; and
      a wireless device detector structured to detect a neighboring wireless device before electric power transmission is started.

11. The power transmission control circuit according to claim 10, wherein the wireless device detector detects the wireless device based on an electrical state of the transmission antenna in a state in which switching of the driver is suspended.

12. The power transmission control circuit according to claim 10, wherein the wireless device detector detects the wireless device based on an electrical state of a power supply line of the driver in a state in which a supply of power to the driver is suspended.

13. The power transmission control circuit according to claim 10, wherein the wireless power transmitter further comprising a reception coil,
   and wherein the wireless device detector detects the wireless device based on an electrical state of the reception coil before electric power transmission is started.

14. The power transmission control circuit according to claim 10, wherein the wireless device detector detects the wireless device based on an electrical state of the reception coil after electric power transmission is started.

15. The power transmission control circuit according to claim 10, wherein, upon detecting the wireless device, the electric power controller and the pre-driver suspend a driving operation of the driver.

16. The power transmission control circuit according to claim 10, further comprising a notification unit structured such that, upon detecting the wireless device, the notification unit notifies an external circuit of a detection result.

17. The power transmission control circuit according to claim 10, monolithically integrated on a single semiconductor substrate.

18. A control method for a wireless power transmitter, wherein the wireless power transmitter comprises:
   a transmission antenna comprising a resonance capacitor and a transmission coil coupled in series;
   a driver comprising a bridge circuit structured to apply a driving voltage across the transmission antenna; and
   a power transmission control circuit structured to control the driver, and wherein the control method comprises:
      judging the presence or absence of a neighboring wireless device before electric power transmission is started; and
      starting electric power transmission when the wireless device has not been detected.

19. The control method according to claim 18, wherein the presence or absence of the wireless device is judged based on an electrical state of the transmission antenna in a state in which switching of the driver is suspended.

20. The control method according to claim 18, wherein the presence or absence of the wireless device is judged based on an electrical state of a power supply line of the driver in a state in which the supply of power to the driver is suspended.

21. The control method according to claim 18, wherein the wireless power transmitter further comprises a reception coil,
   and wherein the presence or absence of the wireless device is judged based on an electrical state of the reception coil.

* * * * *